UNITED STATES PATENT OFFICE.

MAX WALLERSTEIN, OF NEW YORK, N. Y.

YEAST AND PROCESS OF PREPARING AND UTILIZING THE SAME.

No. 858,691.　　　Specification of Letters Patent.　　　Patented July 2, 1907.

Application filed April 21, 1906. Serial No. 313,005.

*To all whom it may concern:*

Be it known that I, MAX WALLERSTEIN, a citizen of the United States, residing at New York, in the county of New York and State of New York, have invented certain new and useful Improvements in Yeast and Processes of Preparing and Utilizing the Same, of which the following is a specification.

This invention relates to the preparation of a yeast for fermenting wort, and to the fermentation of a wort with a yeast so prepared, the object of the invention being to provide a yeast which possesses particular advantages for such fermentation.

While my prepared yeast has been particularly applied to the fermentation of brewer's wort, and possesses especial advantages as hereinafter explained for the production of beer, it is applicable to the fermentation of any raw material for the production of alcohol, and the term "wort" as herein employed is intended to cover any raw material suitable for the production of alcohol by fermentation.

I have discovered that the addition to wort of certain salts exerts a peculiar and favorable influence upon the fermentation and upon the character of the yeast; and I have further discovered that this favorable influence is still more pronounced when the yeast is cultivated in successive worts containing such salts in progressively increasing proportions. Experiments have shown that the influence of calcium salts, more especially the sulfate and chlorid, is particularly beneficial; that favorable results are also obtained with salts of magnesium or potassium; and that the best results are secured by the use of worts containing salts of all of these metals, the yeast being propagated through several generations in each of several successive worts containing regularly increasing proportions of such salts.

I prefer to proceed substantially as follows: A sterilized malt wort of a gravity of about 13° Balling is provided containing per liter; 0.2 gr. calcium sulfate, 0.05 gr. calcium chlorid, 0.01 gr. magnesium sulfate, 0.01 gr. magnesium chlorid, 0.02 gr. potassium chlorid. These salts may be added either during or after the mashing, or to the mashing water. The wort is inoculated with a pure culture of a beer yeast and permitted to ferment. After completion of the fermentation a portion of the resultant yeast is used to inoculate a further quantity of wort of the same composition, this operation being repeated three or four times. The resultant yeast is then used to inoculate a wort prepared as above but containing per liter salts as follows; 0.4 gr. calcium sulfate, 0.1 gr. calcium chlorid, 0.02 gr. magnesium sulfate, 0.02 gr. magnesium chlorid, 0.4 gr. potassium chlorid. The yeast is reproduced three or four times in this wort and then in a wort containing an increased quantity of salt per liter, viz; 0.6 gr. calcium sulfate, 0.15 gr. calcium chlorid, 0.03 gr. magnesium sulfate, 0.03 gr. magnesium chlorid, 0.06 gr. potassium chlorid. Several successive generations are cultivated in this wort, and then in worts of regularly increasing saline content until the concentration of the salts per liter has been increased to the following proportions; 2.0 gr. calcium sulfate, 0.5 gr. calcium chlorid, 0.1 gr. magnesium sulfate, 0.1 gr. magnesium chlorid, 0.2 gr. potassium chlorid. During all of these fermentations the temperature is carefully regulated, the fermentation starting at about 6° C., being permitted to rise during fermentation to 9° C., and closing at about 2° C.

The yeast prepared as above possesses characteristics by which it is readily distinguishable; it is more flocculent than ordinary yeast, and possesses a higher specific gravity; it is furthermore distinguishable by the association with it of the salt or salts added to the wort. It is very readily distinguished by its effect upon brewers' wort when used to ferment the same, the fermentation being better and quicker and resulting in a beer of better foamkeeping quality, improved flavor and greater stability. It is, above all, distinguished by its quick settling and superior clarification qualities, so that the resulting beer can be put on the market within a shorter period. By reason of its peculiar flaky character it envelops the albuminoids and hop resins suspended in the beer and acts as clarifying agent, as a result of which beers produced by means of this yeast are readily finished without the use of chips, thereby resulting in a great economy of time and labor. This ready clarification is probably closely associated with the highly flocculent character of the yeast.

It is necessary that the brewers' worts to be fermented by means of the prepared yeast should receive an addition comprising the same salts used for the cultivation of the yeast. In the instance given there is preferably added per liter of the wort; 0.6 gr. calcium sulfate, 0.15 gr. calcium chlorid, 0.03 gr. magnesium sulfate, 0.03 gr. magnesium chlorid, 0.06 gr. potassium chlorid. Good results are obtained by cultivating the yeast in successive worts containing only a portion of the above mentioned salts, as, for instance, calcium sulfate and magnesium sulfate, or calcium sulfate and calcium chlorid, or calcium sulfate and magnesium chlorid; the best results, however, are obtained by proceeding as above described.

I claim:—

1. The process of preparing yeast which consists in propagating the yeast in successive worts containing regularly increasing proportions of an alkali earth metal sulfate, substantially as described.

2. The process of preparing yeast which consists in propagating the yeast in successive worts containing regularly increasing proportions of sulfates of different alkali earth metals, substantially as described.

3. The process of preparing yeast which consists in propagating the yeast in successive worts containing regularly increasing proportions of alkali earth metal sulfates and chlorids, substantially as described.

4. The process of preparing yeast which consists in propagating the yeast in successive worts containing regularly increasing proportions of alkali earth metal sulfates and chlorids, and potassium chlorid, substantially as described.

5. The process of preparing yeast which consists in propagating the yeast through several generations in each of several successive worts containing regularly increasing proportions of an alkali earth metal sulfate, substantially as described.

6. The process of preparing yeast which consists in propagating the yeast through several generations in each of several successive worts containing regularly increasing proportions of alkali earth metal sulfates and chlorids, substantially as described.

7. The process of fermenting wort which consists in inoculating the same with yeast produced by propagation in successive worts containing regularly increasing proportions of an alkali earth metal sulfate, substantially as described.

8. The process of fermenting wort which consists in inoculating the same with yeast produced by propagation in successive worts containing regularly increasing proportions of alkali earth metal sulfates and chlorids, substantially as described.

9. The process of fermenting wort which consists in adding thereto a suitable proportion of an alkali earth metal sulfate, and inoculating it with yeast produced by propagation in successive worts containing regularly increasing proportions of the same salt, substantially as described.

10. The process of fermenting wort which consists in adding thereto a suitable proportion of alkali earth metal sulfates and chlorids, and inoculating it with yeast produced by propagation in successive worts containing regularly increasing proportions of the same salts, substantially as described.

11. A prepared yeast distinguished by its flocculent character, by its rapid and complete clarification or settling in beer in the absence of chips, and by its relatively high proportion of associated mineral salts of alkali earth metals, substantially as described.

In testimony whereof, I affix my signature in presence of two witnesses.

MAX WALLERSTEIN.

Witnesses:
FREDERICK RATH,
CHAS. L. HOLBEIN.